United States Patent
Fujii et al.

(10) Patent No.: US 9,042,900 B2
(45) Date of Patent: May 26, 2015

(54) USER TERMINAL

(71) Applicant: NTT DOCOMO, INC., Chiyoda-ku (JP)

(72) Inventors: Hiromasa Fujii, Tokyo (JP); Hiroto Yasuda, Tokyo (JP); Hiroki Harada, Tokyo (JP); Shunji Miura, Tokyo (JP); Hidetoshi Kayama, Tokyo (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 14/251,216

(22) Filed: Apr. 11, 2014

(65) Prior Publication Data

US 2014/0221030 A1    Aug. 7, 2014

Related U.S. Application Data

(62) Division of application No. 13/361,318, filed on Jan. 30, 2012.

(30) Foreign Application Priority Data

Feb. 23, 2011    (JP) .................................. 2011-037068

(51) Int. Cl.
  *H04W 36/00*    (2009.01)
  *H04W 16/14*    (2009.01)
  (Continued)

(52) U.S. Cl.
  CPC .............. *H04W 16/14* (2013.01); *H04B 1/005* (2013.01); *H04B 1/1027* (2013.01);
  (Continued)

(58) Field of Classification Search
  CPC ............ H04W 74/0833; H04W 16/14; H04W 72/082

USPC ......................................... 455/436, 443, 63.1
See application file for complete search history.

(56) References Cited

U.S. PATENT DOCUMENTS 8,311,026 B2    11/2012 Kishiyama et al.
8,644,277 B2 *  2/2014 Zhang et al. ................... 370/338
(Continued)

FOREIGN PATENT DOCUMENTS

JP    2009-49538 A    3/2009
JP    2010-147916 A    7/2010
(Continued)

OTHER PUBLICATIONS

Office Action issued Jun. 10, 2014 in Japanese Patent Application No. 2011-037068 (with English language translation).
(Continued)

*Primary Examiner* — Tu X Nguyen
(74) *Attorney, Agent, or Firm* — Oblon, McClelland, Maier & Neustadt, L.L.P.

(57) ABSTRACT

A CRS base station (21) includes a transmitting section configured to transmit a synchronization establishment signal, a receiving section configured to receive a random access signal corresponding to the synchronization establishment signal, a determining section configured to determine whether or not the random access signal received by the receiving section has been transmitted from an MCS terminal (12) and an interference reduction processing section configured to perform interference reduction processing on the MCS terminal (12) when the determining section determines that the random access signal has been transmitted from the MCS terminal (12).

8 Claims, 8 Drawing Sheets

(51) Int. Cl.
*H04B 1/00* (2006.01)
*H04B 1/10* (2006.01)
*H04W 56/00* (2009.01)
*H04W 72/08* (2009.01)
*H04W 28/04* (2009.01)
*H04W 74/08* (2009.01)
*H04W 88/08* (2009.01)

(52) U.S. Cl.
CPC ........... *H04W 28/048* (2013.01); *H04W 56/00* (2013.01); *H04W 74/0833* (2013.01); *H04W 88/08* (2013.01); *H04W 72/082* (2013.01)

(56) References Cited

U.S. PATENT DOCUMENTS

2009/0197631 A1   8/2009   Palanki et al.
2011/0116480 A1*  5/2011   Li et al. .......................... 370/332
2011/0263285 A1  10/2011   Kronander et al.

FOREIGN PATENT DOCUMENTS

| JP | 2011-4002 | 1/2011 |
| WO | WO 2009/044543 A1 | 4/2009 |
| WO | WO 2009/099813 A1 | 8/2009 |
| WO | WO 2010/074622 A1 | 7/2010 |

OTHER PUBLICATIONS

Extended European Search Report issued May 4, 2012 in Patent Application No. 12153246.9.

Frank H. P. Fitzek, "The Medium is the Message", IEEE International Conference On, XP031025708A, Jun. 1, 2006, pp. 5016-5021.

* cited by examiner

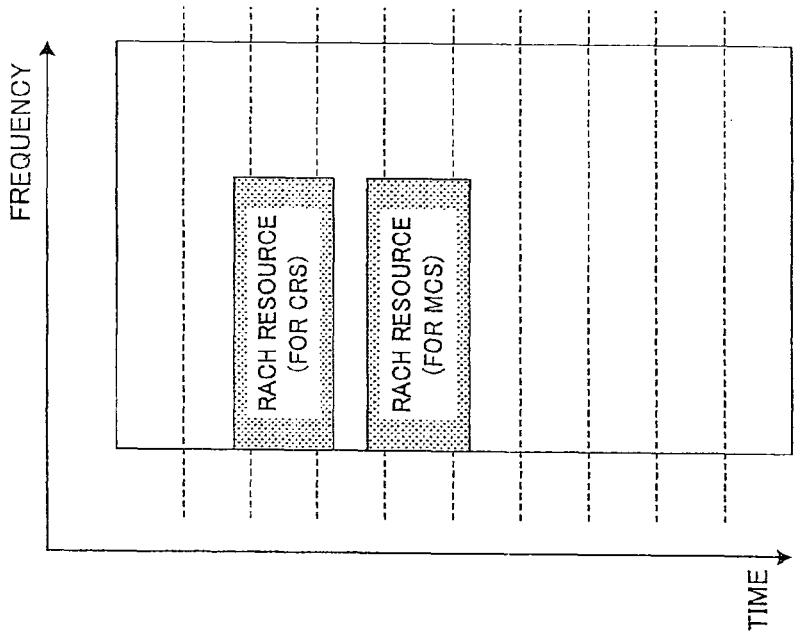
FIG.5B
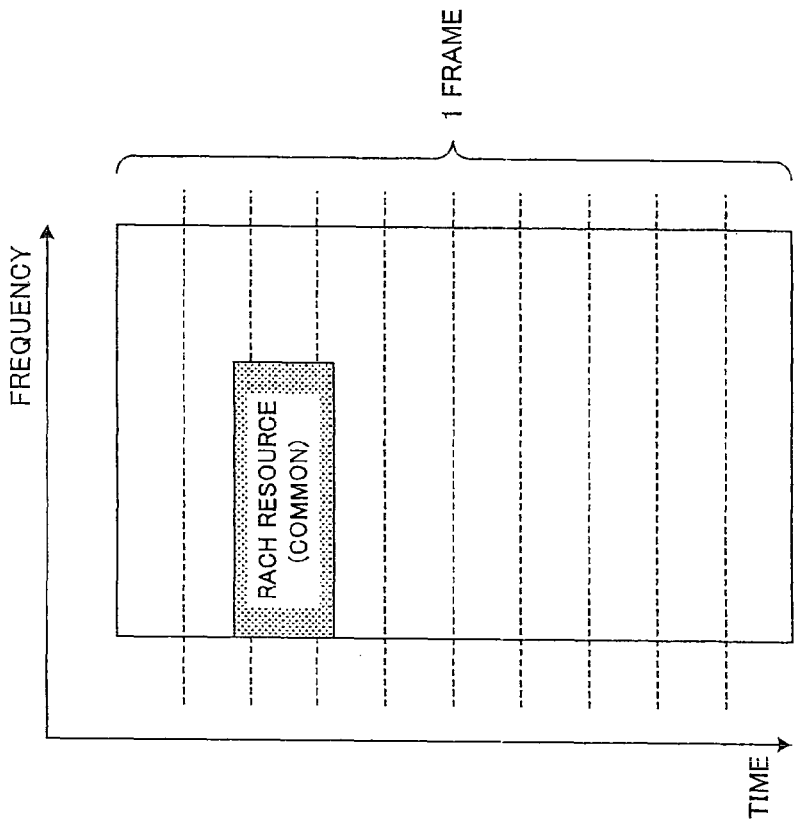
FIG.5A
FIG.5

| RACH SEQUENCE ID | AMOUNT OF INTERFERENCE SUPPRESSION |
|---|---|
| 00001 | + xx dB |
| 00002 | + yy dB |
| 00003 | − zz dB |

FIG.6

| S-SS ID | CONTENTS |
|---|---|
| 00001 | SELECT RACH SEQUENCE ID CORRESPONDING TO AMOUNT OF INTERFERENCE SUPPRESSION |
| 00002 | MCS TERMINAL 12 WHOSE PREVIOUS AMOUNT OF INTERFERENCE SUPPRESSION IS FIRST THRESHOLD OR ABOVE RANDOMLY SELECTS SIGNAL SEQUENCE |
| 00003 | MCS TERMINAL 12 WHOSE PREVIOUS AMOUNT OF INTERFERENCE SUPPRESSION IS SECOND THRESHOLD OR ABOVE RANDOMLY SELECTS SIGNAL SEQUENCE |
| 00004 | MCS TERMINAL 12 WHOSE PREVIOUS AMOUNT OF INTERFERENCE SUPPRESSION IS THIRD THRESHOLD OR ABOVE RANDOMLY SELECTS SIGNAL SEQUENCE |

FIG.8

USER TERMINAL

CROSS-REFERENCE TO RELATED APPLICATIONS

This application is a divisional application of Ser. No. 13/361,318, filed Jan. 30, 2012, which is based upon and claims the benefit of priority from the prior Japanese Patent Application No. 2011-037068 filed on Feb. 23, 2011; the entire contents of each are incorporated herein by reference.

BACKGROUND OF THE INVENTION

1. Field of the Invention

The present invent ion relates to a radio base station, user terminal and frequency band sharing method for sharing at least part of a frequency band between radio communication systems whose communication areas spatially and at least partially overlap each other.

2. Description of the Related Art

In recent years, studies are being carried out on a system configuration in which in a communication area of MCS (Macro Cell System) which is an existing radio communication system, a communication area of CRS (Cognitive Radio System) different from the MCS is arranged so as to overlap with the communication area of the MCS. In such a system configuration of communication areas of a plurality of radio communication systems overlapping with each other, it is under study how to improve utilization efficiency of frequency bands by sharing at least part of a frequency band among the plurality of radio communication systems.

When communication areas of a plurality of radio communication systems sharing a frequency band overlap each other, if a user terminal of a first radio communication system (e.g., MCS) is located near a radio base station of a second radio communication system (e.g., CRS), the user terminal receives considerable interference from the radio base station. Therefore, studies are also being carried out on the possibility of the user terminal of the first radio communication system (e.g., MCS) requesting the radio base station of the second radio communication system (e.g., CRS) to perform interference reduction processing based on a detection result of a broadcast signal (e.g., busy tone) from the radio base station (e.g., see Japanese Patent Application Laid-Open No. 2011-004002).

However, when communication areas of a plurality of radio communication systems sharing a frequency band overlap each other, as described above, if the user terminal of the first radio communication system (e.g., MCS) implements functions for enabling to detect a broadcast signal from the radio base station of the second radio communication system (e.g., CRS) and request the radio base station to perform interference reduction processing, there is a problem that the implementing load of the user terminal of the first radio communication system increases.

SUMMARY OF THE INVENTION

The present invention has been implemented in view of the above problem and it is an object of the present invention to provide a radio base station, user terminal and frequency band sharing method when communication areas of a plurality of radio communication systems sharing a frequency band overlap each other, without considerably increasing the implementing load of a user terminal of a first radio communication system, allowing the user terminal of the first radio communication system to reduce interference received from a radio base station of a second radio communication system.

A radio base station according to a first aspect of the present invention is a radio base station of a second radio communication system that shares at least part of a frequency band with a first radio communication system, including a transmitting section configured to transmit a synchronization establishment signal, a receiving section configured to receive a random access signal corresponding to the synchronization establishment signal, a determining section configured to determine whether or not the random access signal received by the receiving section has been transmitted from a user terminal of the first radio communication system, and an interference reduction processing section configured to perform interference reduction processing on the user terminal of the first radio communication system, when the determining section determines that the random access signal has been transmitted from the user terminal of the first radio communication system.

A user terminal according to a second aspect of the present invention is a user terminal of a first radio communication system that shares at least part of a frequency band with a second radio communication system, including a receiving section configured to receive a synchronization establishment signal, a determining section configured to determine whether the synchronization establishment signal received by the receiving section has been broadcast from a radio base station of the second radio communication system, and a transmitting section configured to transmit a random access signal to the radio base station of the second radio communication system to request the radio base station to perform interference reduction processing, when the determining section determines that the synchronization establishment signal has been broadcast from the radio base station of the second radio communication system.

A frequency band sharing method according to a third aspect of the present invention is a frequency band sharing method for sharing at least part of a frequency band between a first radio communication system and a second radio communication system, including the steps of receiving, at a user terminal of the first radio communication system, a synchronization establishment signal, determining, at the user terminal of the first radio communication system, whether or not the received synchronization establishment signal has been broadcast from a radio base station of the second radio communication system, transmitting, at the user terminal of the first radio communication system, when the received synchronization establishment signal is determined to have been broadcast from the radio base station of the second radio communication system, a random access signal to the radio base station to request the radio base station to perform interference reduction processing, receiving, at the radio base station of the second radio communication system, a random access signal, determining, at the radio base station of the second radio communication system, whether or not the received random access signal has been transmitted from the user terminal of the first radio communication system, and performing, at the radio base station of the second radio communication system, interference reduction processing on the user terminal of the first radio communication system when the received random access signal is determined to have been transmitted from the user terminal of the first radio communication system.

BRIEF DESCRIPTION OF THE DRAWINGS

FIGS. 5(A) and (B) are diagrams illustrating an example of allocation of radio resources of a random access signal according to the present embodiment;

FIG. 6 is a diagram illustrating an example of association of a RACH sequence ID and an amount of interference suppression according to the present embodiment;

FIG. 8 is a diagram illustrating an example of contents specified by an S-SS ID according to the present embodiment.

DETAILED DESCRIPTION OF THE INVENTION

Figure 1:
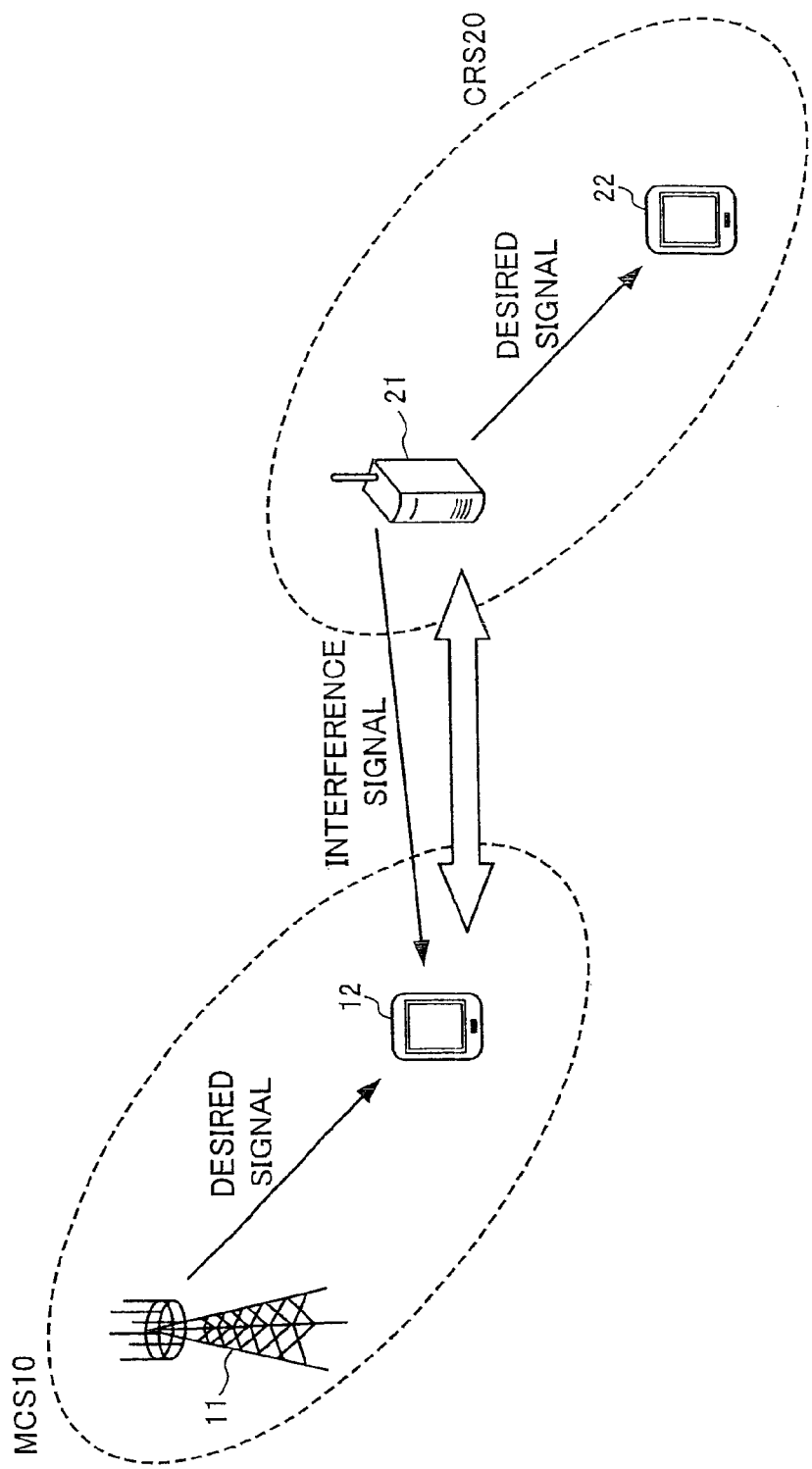
FIG. 1 is a diagram illustrating a system configuration when communication areas of a plurality of radio communication systems sharing a frequency band overlap.

FIG. 1 is a diagram illustrating a system configuration when communication areas of a plurality of radio communication systems sharing a frequency band overlap. The system configuration shown in FIG. 1 is an illustration and is not limited to this configuration. The present invention is applicable to any configuration in which a plurality of radio communication areas sharing the same frequency band are arranged so as to overlap each other.

An example will be described below where an MCS (Macro Cell System) 10 and a CRS (Cognitive Radio System) 20 share a frequency band, but a plurality of radio communication systems sharing a frequency band are not limited to this. The present invention is applicable to any combination of a plurality of radio communication systems sharing at least part of a frequency band.

FIG. 1 shows a case where MCS 10 which is an existing system and CRS 20 have overlapping communication areas each other and share a frequency band. A radio base station (hereinafter referred to as "MCS base station") 11 of the MCS 10 transmits a signal to a user terminal (hereinafter referred to as "MCS terminal") 12 located in its own cell. Furthermore, a radio base station (hereinafter referred to as "CRS base station") 21 of the CRS 20 also transmits a signal to a user terminal (hereinafter referred to as "CRS terminal") 22 located in its own cell. The numbers of MCS base stations 11, MCS terminals 12, CRS base stations 21 and CRS terminals 22 are not limited to those shown in FIG. 1.

As shown in FIG. 1, when located near the CRS base station 21, the MCS terminal 12 receives not only a desired signal from the MCS base station 11 but also an interference signal from the CRS base station 21. Thus, the MCS terminal 12 detects the interference broadcast signal from the CRS base station 21 and transmits an interference suppression request signal to the CRS base station 21 based on the detection result of the interference broadcast signal. In response to the interference suppression request signal from the MCS terminal 12, the CRS base station 21 performs interference reduction processing (e.g., reduction of transmission power, suspension of transmission, application of MIMO or the like).

As described above, in FIG. 1, interference control signals such as the above-described interference broadcast signal and interference suppression request signal are transmitted/received between the MCS terminal 12 and the CRS base station 21. Here, when these interference control signals are defined in a new format, the MCS 10 which is the existing system needs to implement a configuration of detecting the control signals defined in the new format. For this reason, the implementing load of the MCS terminal 12 increases.

A frequency band sharing method according to the present invention defines an interference control signal using the signal format of the MCS 10 which is the existing system. Thus, defining the interference control signal using the control signal format of the MCS 10 allows the MCS terminal 12 to reduce interference received from the CRS base station 21 without increasing the implementing load on the MCS terminal 12. Here, the MCS 10 transmits various control signals, but since it is necessary to be able to identify the base station that sends the control signals from the received signal in order to use those signals as interference control signals, these signals preferably have a signal format of a synchronization establishment signal of the MCS 10.

Figure 2:
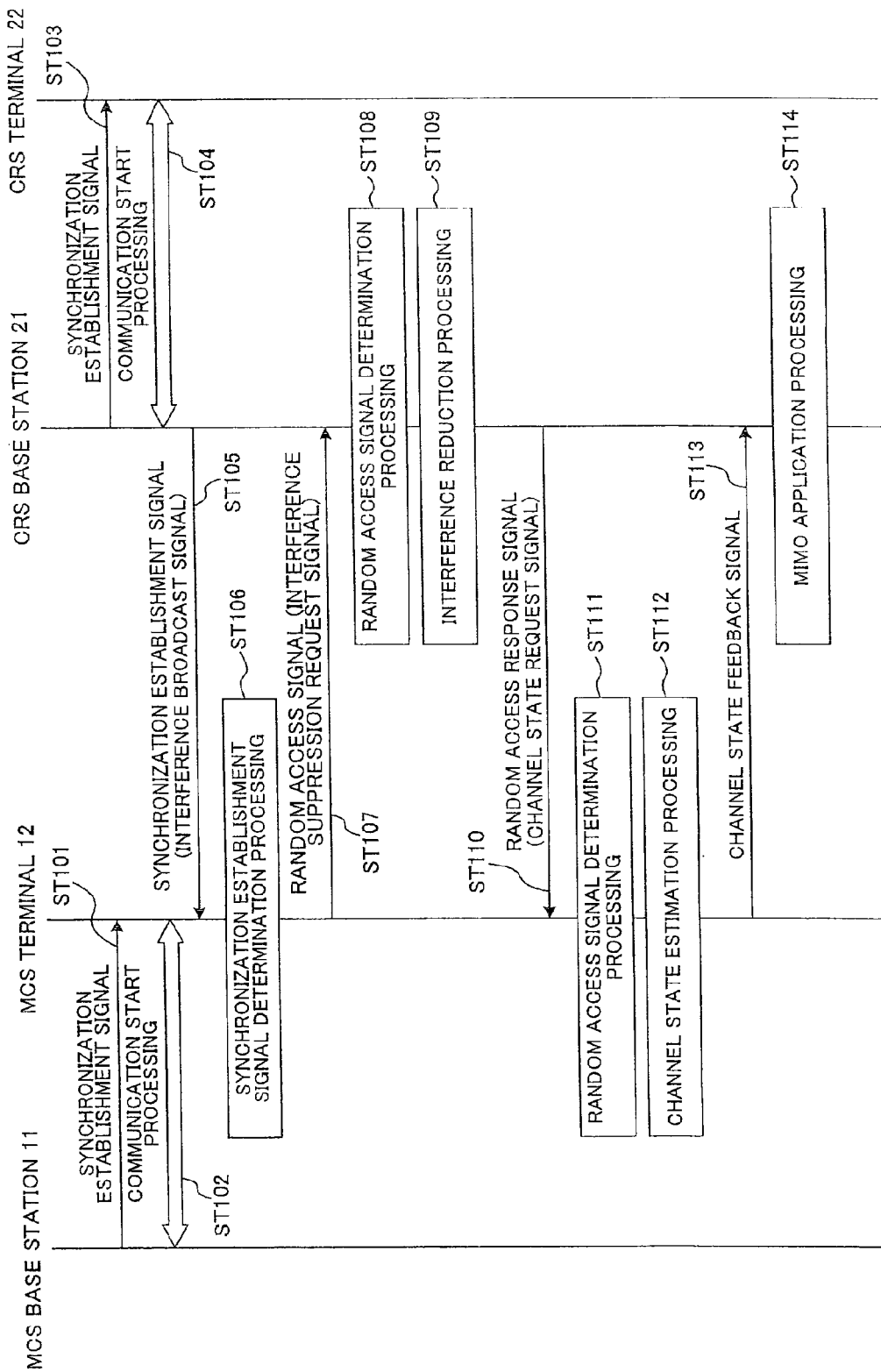
FIG. 2 is a sequence diagram showing a frequency band sharing method according to the present invention.

FIG. 2 is a sequence diagram showing a frequency band sharing method according to the present invention. In FIG. 2, the MCS terminal 12 performs interference control processing (steps ST105 to ST113) after communication start processing with the MCS base station 11 (steps ST101 and ST102), but the sequence is not limited to this. For example, the communication start processing between the MCS base station 11 and MCS terminal 12 may be performed in parallel with interference control processing or may be omitted. The same applies to the communication start processing between the CRS base station 21 and CRS terminal (steps ST103 and ST104).

As shown in FIG. 2, the MCS base station 11 broadcasts a synchronization establishment signal (step ST101). Here, the "synchronization establishment signal" is a signal for the MCS terminal 12 to identify the MCS base station 11 and establish synchronization on a downlink.

The MCS terminal 12 detects the synchronization establishment signal broadcast from the MCS base station 11 and performs communication start processing with the MCS base station 11 (step ST102). To be more specific, the MCS terminal 12 transmits a random access signal to the MCS base station 11. The MCS base station 11 transmits a random access response signal corresponding to the random access signal to the MCS terminal 12. The MCS terminal 12 transmits identification information or the like of the MCS terminal 12 to the MCS base station 11 via an uplink shared channel (PUSCH) specified by the random access response signal. Data communication between the MCS terminal 12 and the MCS base station 11 is started after the above-described communication start processing.

The CRS base station 21 broadcasts a synchronization establishment signal (step ST103). The CRS terminal 22 detects the synchronization establishment signal broadcast from the CRS base station 21 and performs the above-described communication start processing with the CRS base station 21 (step ST104).

The synchronization establishment signal broadcast in step ST103 is received by not only the CRS terminal 22 but also the MCS terminal 12 located near the CRS base station 21 (step ST105). The synchronization establishment signal is used in relation to CRS terminal 22 as a signal to establish synchronization with the CRS base station 21, whereas the synchronization establishment signal is used in relation to the MCS terminal 12 as an interference broadcast signal for the MCS terminal 12 to recognize influences of interference from the CRS base station 21. As will be described later, the CRS base station 21 broadcasts the synchronization establishment signal with a transmission frequency or signal sequence different from those of the synchronization establishment signal broadcast from the MCS base station 11. The synchronization establishment signal is broadcast, for example, through a synchronization channel (SCH).

The MCS terminal 12 determines whether or not the received synchronization establishment signal has been broadcast from the CRS base station 21 (step ST106). As will be described later, the MCS terminal 12 determines, based on the reception frequency or signal sequence of the received synchronization establishment signal, whether or not the synchronization establishment signal has been broadcast from the CRS base station 21.

When it is determined that the received synchronization establishment signal has been broadcast from the CRS base station 21, the MCS terminal 12 transmits a random access signal to the CRS base station 21 (step ST107). The random access signal is not intended to be used as a signal to start communication with the CRS base station 21 like the random access signal transmitted to the CRS base station 21 in the above-described communication start processing (step ST102). The random access signal is used as an interference suppression request signal to request the CRS base station 21 to suppress interference. As will be described later, the MCS terminal 12 transmits the random access signal with a radio resource or signal sequence different from those of the random access signal transmitted from the CRS terminal 22. A random access signal is transmitted, for example, through a random access channel (RACH).

The CRS base station 21 determines whether the received random access signal has been transmitted from the MCS terminal 12 (step ST108). As will be described later, the CRS base station 21 determines, based on radio resources with which the random access signal is received or the signal sequence of the random access signal, whether or not the random access signal has been transmitted from the MCS terminal 12.

When it is determined that the received random access signal has been transmitted from the MCS terminal 12, the CRS base station 21 performs interference reduction processing (e.g., transmission power control, suspension of transmission or the like) on the MCS terminal 12 (step ST109). As will be described later, the CRS base station 21 performs the interference reduction processing based on the receiving power or signal sequence of the received random access signal.

Furthermore, the CRS base station 21 may also apply MIMO as interference reduction processing on the MCS terminal 12. When applying MIMO, the CRS base station 21 transmits a random access response signal to the MCS terminal (step ST110). The random access response signal is not intended to be used to start communication with the MCS terminal 12 like the random access response signal transmitted from the MCS base station 11 in the above-described communication start processing (step ST102). The random access response signal is used as a channel state request signal to request channel information from the MCS terminal 12. The random access response signal is transmitted through, for example, a downlink shared channel (PDSCH).

The MCS terminal 12 determines whether or not the received random access response signal has been broadcast from the CRS base station 21 (step ST111). As will be described later, the MCS terminal 12 determines, based on identification information of the signal sequence of the random access signal included in the received random access response signal, whether or not the received random access response signal has been transmitted from the CRS base station 21 to the MCS terminal 12.

When it is determined that the received random access response signal has been broadcast from the CRS base station 21 to the MCS terminal 12, the MCS terminal 12 estimates the channel state based on a reference signal from the CRS base station 21 (step ST112). The channel state refers to a channel estimate value itself.

The MCS terminal 12 transmits a channel state feedback signal including the estimated channel state to the CRS base station 21 (step ST113). The channel information request feedback signal is transmitted through, for example, an uplink shared channel (PUSCH). Furthermore, for the channel information request feedback signal, a default signal format transmitted through a PUSCH may be used.

The CRS base station 21 applies a MIMO technique based on the channel state feedback signal from the MCS terminal 12 (step ST114).

A case has been described in FIG. 2 by way of example where the MCS terminal 12 itself estimates the channel state according to the random access response signal (channel state request signal) from the CRS base station 21 and reports it to the CRS base station 21, but the present invention is not limited to this. For example, the MCS terminal 12 may transmit a reference signal to the CRS base station 21 in response to the random access response signal (channel state request signal) from the CRS base station 21 and the CRS base station 21 may estimate the channel state based on the reference signal from the MCS terminal 12.

As described above, the frequency band sharing method according to the present invention uses an existing signal format of the MCS 10 such as a synchronization establishment signal, random access signal and random access response signal to define interference control signals, by which the MCS terminal 12 controls interference received from the CRS base station 21, such as interference broadcast signal, interference suppression request signal and channel state request signal respectively. Therefore, it is possible to reduce interference received by the MCS terminal 12 from the CRS base station 21 without significantly increasing the implementing load in the MCS terminal 12.

Hereinafter, embodiments of the present invention will be described in detail with reference to the accompanying drawings. To be more specific, function configurations of the MCS terminal and CRS base station for implementing the above-described frequency band sharing method according to the present invention will be described.

The MCS terminal 12 and CRS base station 21 are each provided with hardware including an antenna, RF circuit, communication interface, processor, memory, transmission/reception circuit or the like, and the memory stores software modules executed by the processor. The function configurations, which will be described later, may be implemented by the above-described hardware or may be implemented by software modules executed by the processor or may be implemented by a combination of both.

Figure 3:
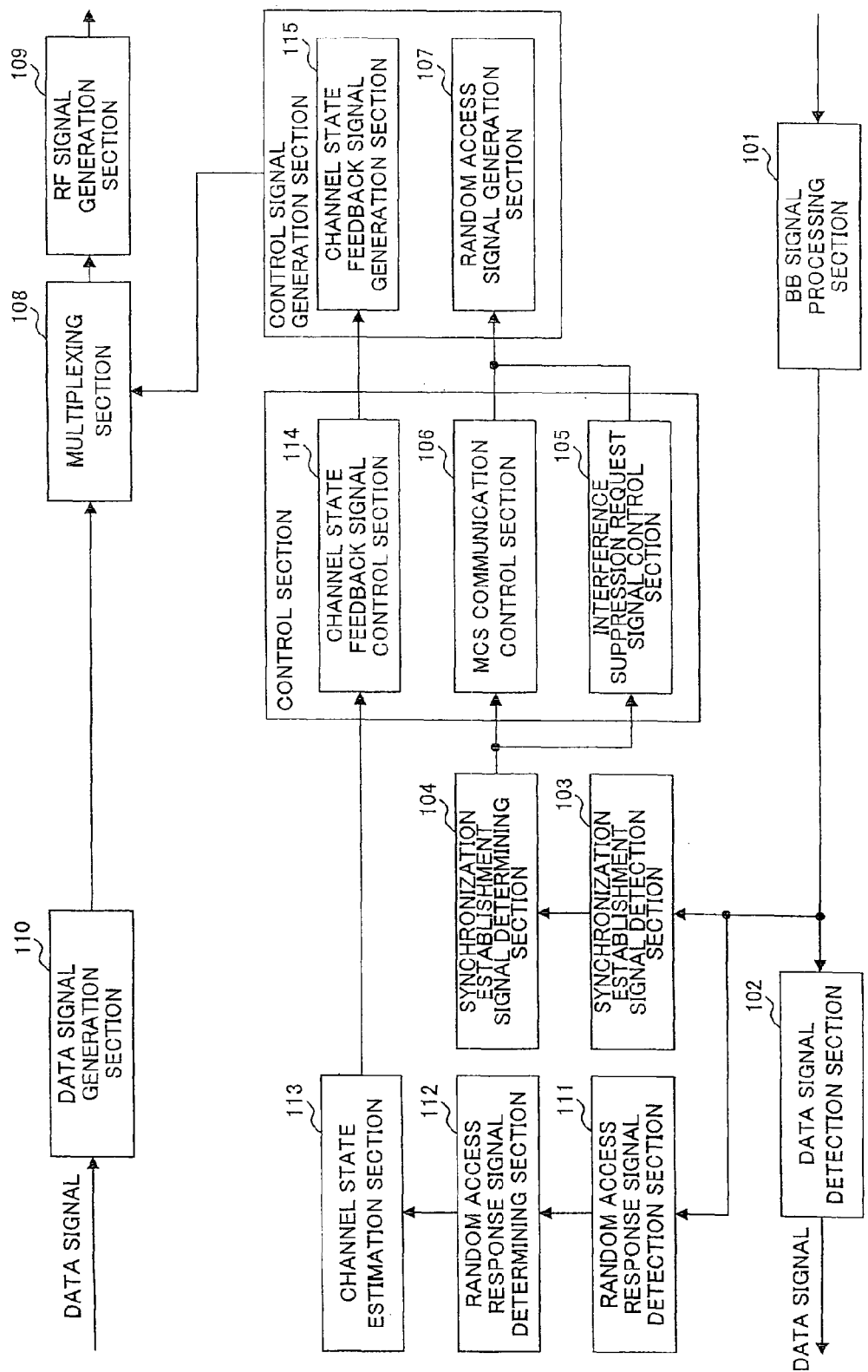
FIG. 3 is a function block diagram of an MCS terminal according to the present embodiment.

FIG. 3 is a function block diagram of an MCS terminal according to an embodiment of the present invention. As shown in FIG. 3, the MCS terminal 12 includes a baseband (BB) signal processing section 101, a data signal detection section 102, a synchronization establishment signal detection section 103, a synchronization establishment signal determining section 104, an interference suppression request signal control section 105, an MCS communication control section 106, a random access signal generation section 107, a multiplexing section 108, an RF signal generation section 109, a data signal generation section 110, a random access response signal detection section 111, a random access response signal determining section 112, a channel state estimation section 113, a channel state feedback signal control section 114 and a channel state feedback signal generation section 115.

The BB signal processing section 101 converts a radio frequency signal received via an antenna to a baseband signal, demodulates the baseband signal and separates it into a data signal and a control signal. The BB signal processing section 101 outputs the separated data signal to the data signal detection section 102 and outputs the separated control signal to the synchronization establishment signal detection section 103 and random access response signal detection section 111. The antenna, BB signal processing section 101, synchronization establishment signal detection section 103 and random access response signal detection section, which will be described later, constitute a receiving section.

The synchronization establishment signal detection section 103 detects a synchronization establishment signal from the control signal inputted from the BB signal processing section 101. Here, the "synchronization establishment signal" is a signal broadcast from the MCS base station 11 or CRS base station 21 so that the MCS terminal 12 can detect a desired cell. The synchronization establishment signal is transmitted through, for example, a synchronization channel (SCH). The synchronization establishment signal detection section 103 outputs the detected synchronization establishment signal to the synchronization establishment signal determining section 104.

The synchronization establishment signal determining section 104 determines whether or not the synchronization establishment signal detected in the synchronization establishment signal detection section 103 has been broadcast from the CRS base station 21. To be more specific, the synchronization establishment signal determining section 104 determines whether or not the synchronization establishment signal has been broadcast from the CRS base station 21 using the following first or second synchronization establishment signal determination method.

Figure 4:
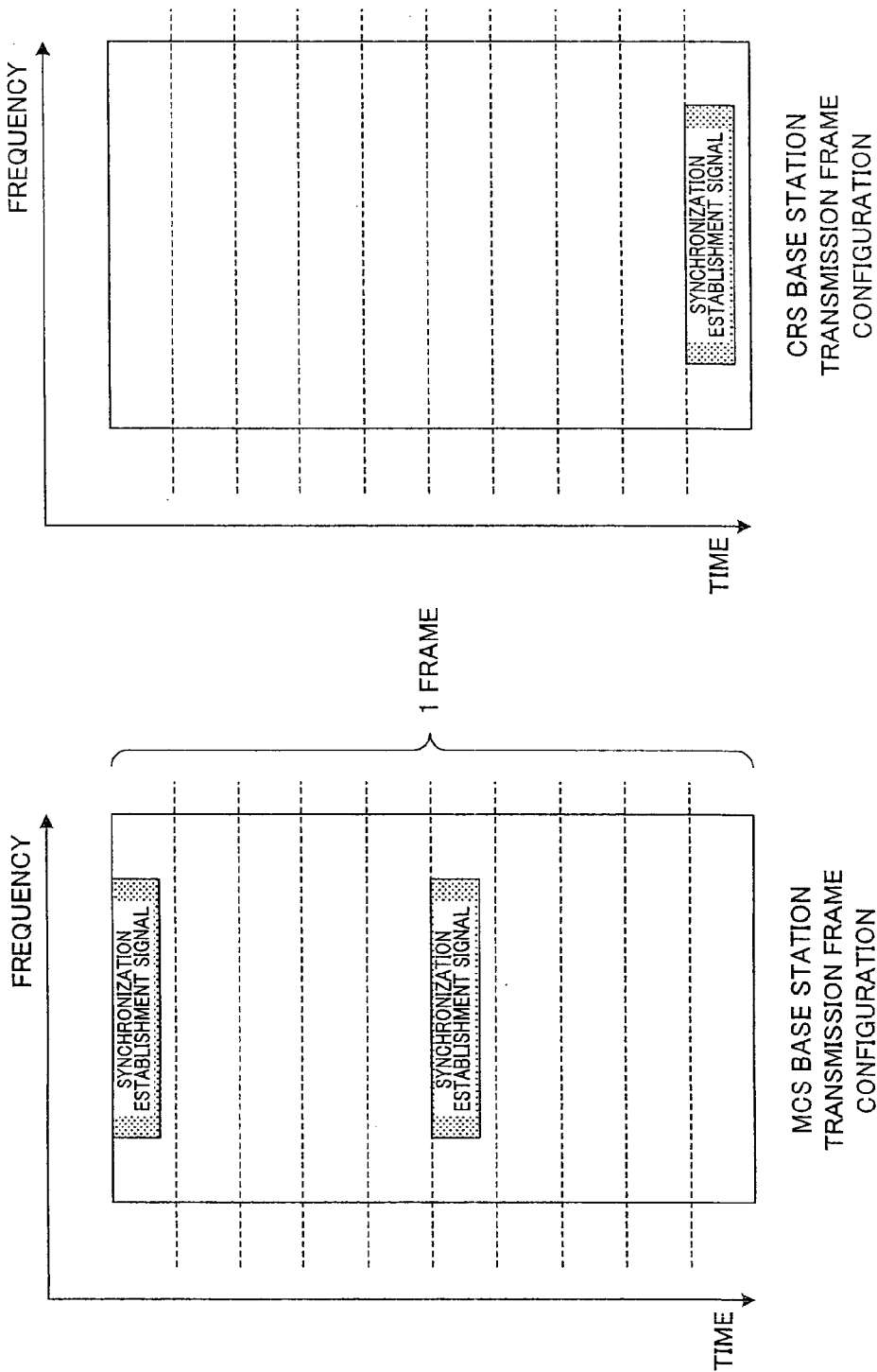
FIG. 4 is a diagram illustrating a transmission frequency of a synchronization establishment signal according to the present embodiment.

According to the first synchronization establishment signal determination method, the synchronization establishment signal determining section 104 determines, based on a peak detection frequency of the synchronization establishment signal detected by the synchronization establishment signal detection section 103, whether or not the synchronization establishment signal has been broadcast from the CRS base station 21. In this case, as shown in FIG. 4, the synchronization establishment signal from the CRS base station 21 is broadcast with a transmission frequency different from that of the synchronization establishment signal broadcast from the MCS base station 11. For this reason, the peak detection frequency of correlation detection of a synchronization establishment signal in the synchronization establishment signal detection section 103 also differs between the MCS base station 11 and CRS base station 21.

For example, in FIG. 4, the transmission frequency of a synchronization establishment signal from the MCS base station 11 is two times per frame. On the other hand, the transmission frequency of a synchronization establishment signal from the CRS base station 21 is one time per frame. That is, in the case of FIG. 4, the transmission frequency of a synchronization establishment signal from the CRS base station 21 is fewer than the transmission frequency of a synchronization establishment signal from the MCS base station 11. Therefore, in the case of FIG. 4, when the peak detection frequency of synchronization establishment signal in the synchronization establishment signal detection section 103 is fewer than the peak detection frequency of another synchronization establishment signal, the synchronization establishment signal determining section 104 determines that the synchronization establishment signal has been broadcast from the CRS base station 21.

According to the second synchronization establishment signal determination method, the synchronization establishment signal determining section 104 determines, based on the signal sequence of the synchronization establishment signal detected by the synchronization establishment signal detection section 103, whether or not the synchronization establishment signal has been broadcast from the CRS base station 21. In this case, the synchronization establishment signal from the CRS base station 21 is broadcast with a signal sequence different from that of the synchronization establishment signal broadcast from the MCS base station 11. The signal sequence used for the synchronization establishment signal from the CRS base station 21 may be set in the MCS terminal 12 beforehand or may be reported from the MCS base station 11.

When it is determined that the synchronization establishment signal detected by the synchronization establishment signal detection section 103 has been broadcast from the CRS base station 21 according to the above-described first or second synchronization establishment signal determination method, the synchronization establishment signal determining section 104 outputs the synchronization establishment signal to the interference suppression request signal control section 105. On the other hand, when it is determined that the detected synchronization establishment signal has been broadcast from the MCS base station 11, the synchronization establishment signal determining section 104 outputs the synchronization establishment signal to the MCS communication control section 106. The synchronization establishment signal determining section 104 constitutes a determining section.

When the synchronization establishment signal determining section 104 determines that a synchronization establishment signal has been broadcast from the CRS base station 21, the interference suppression request signal control section 105 performs control processing to request the CRS base station 21 to perform interference reduction processing. To be more specific, the interference suppression request signal control section 105 controls the random access signal generation section 107 so as to transmit a random access signal as an interference suppression request signal using the following first or second interference suppression request signal transmission method.

According to the first interference suppression request signal transmission method, the interference suppression request signal control section 105 instructs the random access signal generation section 107 to allocate the random access signal as the interference suppression request signal to a radio resource different from that of the random access signal transmitted from the CRS terminal 22. In this case, as shown in FIG. 5B, radio resources for a random access signal are provided separately for the MCS 10 and for the CRS 20. Thus, the interference suppression request signal control section 105 instructs the random access signal generation section 107 to allocate the random access signal as the interference suppression request signal to a radio resource provided for the MCS 10. The radio resource for the MCS 10 may be set in the MCS terminal 12 beforehand or may be reported from the MCS base station 11.

According to the second interference suppression request signal transmission method, the interference suppression request signal control section 105 instructs the random access signal generation section 107 to generate a random access signal as the interference suppression request signal with a signal sequence different from that of the random access signal transmitted from the CRS terminal 22. In this case, a group of signal sequences for random access signals (hereinafter referred to as "RACH sequence group") is allocated separately for the MCS 10 and for the CRS 20. The RACH sequence group for the MCS 10 may be set in the MCS terminal 12 beforehand or may be reported from the MCS base station 11.

According to the second interference suppression request signal transmission method, the interference suppression request signal control section 105 may instruct the random access signal generation section 107 to generate a random access signal as an interference suppression request signal with a signal sequence randomly selected from the RACH sequence group for the MCS 10. In this case, the interference suppression request signal control section 105 instructs the random access signal generation section 107 to transmit the random access signal with certain transmission power. This is to allow the CRS base station 21 to estimate the amount of interference suppression based on the receiving power of the random access signal.

Furthermore, according to the second interference suppression request signal transmission method, the interference suppression request signal control section 105 may also instruct the random access signal generation section 107 to generate a random access signal as an interference suppression request signal with a signal sequence corresponding to a desired amount of interference suppression selected from the RACH sequence group for the MCS 10. In this case, as shown in FIG. 6, the RACH sequence ID and the amount of interference suppression are stored in association with each other in the MCS terminal 12. Here, the RACH sequence ID is identification information of a signal sequence for a random access signal. A signal sequence of the aforementioned RACH sequence group for the MCS 10 is identified by the RACH sequence ID.

As shown in FIG. 6, when the RACH sequence ID and the amount of interference suppression are associated with each other, the interference suppression request signal control section 105 calculates an amount of interference suppression based on a signal transmitted from the CRS base station 21 and acquires an RACH sequence ID corresponding to the calculated amount of interference suppression. The interference suppression request signal control section 105 instructs to generate a random access signal as an interference suppression request signal with a signal sequence corresponding to the acquired RACH sequence ID.

The amount of interference suppression shown in FIG. 6 may be for any one of a CRS-dedicated band and MCS-dedicated band. In the case of the amount of interference suppression for the CRS-dedicated band, the interference suppression request signal control section 105 can calculate an amount of interference suppression based on the synchronization establishment signal broadcast from the CRS base station 21 in the CRS-dedicated band. The amount of interference suppression is calculated using, for example, following equation (1).

(Amount of interference suppression)=(receiving power of synchronization establishment signal)−(allowable interference power in MCS terminal)   Equation (1)

On the other hand, in the case of an amount of interference suppression for the MCS-dedicated band, the interference suppression request signal control section 105 can calculate an amount of interference suppression based on a signal broadcast in a band shared between the MCS 10 and CRS 20.

The above-described association between the RACH sequence ID and amount of interference suppression may be set in the MCS terminal 12 beforehand or may be reported from the MCS base station 11. Furthermore, FIG. 6 is merely an example and the present invention is not limited to this. The amount of interference suppression may be expressed by a relative value as shown in FIG. 6 or may be expressed by an absolute value. Furthermore, the RACH sequence ID may be associated with an amount of interference suppression having a minus value to increase the transmission power from the CRS base station 21.

As described above, according to the second interference suppression request signal transmission method, the interference suppression request signal control section 105 may randomly select a signal sequence from the RACH sequence group for the MCS 10 or may select a signal sequence in accordance with the amount of interference suppression. The selecting method of this signal sequence may be specified by the synchronization establishment signal broadcast from the CRS base station 21. As will be described later, the CRS base station 21 specifies, by using identification information of a secondary synchronization signal (Secondary-SS), the above-described selecting method of the signal sequence or the MCS terminal 12 to which the random access signal (interference suppression request signal) should be transmitted (see FIG. 8). The interference suppression request signal control section 105 selects a signal sequence from the RACH sequence group for the MCS 10 using the selecting method specified by the secondary synchronization signal.

Furthermore, according to the second interference suppression request signal transmission method, a signal sequence indicating that MIMO is supported and a signal sequence indicating that MIMO is not supported may be provided in the above RACH sequence group for the MCS 10. When the MCS terminal 12 does not support MIMO, the interference suppression request signal control section 105 selects a signal sequence indicating that MIMO is not supported. On the other hand, when the MCS terminal 12 supports MIMO, the interference suppression request signal control section 105 selects a signal sequence indicating that MIMO is supported. Thus, by reporting whether or not the MCS terminal 12 supports MIMO using a signal sequence of a random access signal, the CRS base station 21 can perform appropriate interference reduction processing on the MCS terminal 12.

Furthermore, with the second interference suppression request signal transmission method, a signal sequence indicating that the interference suppression effect by MIMO is decreasing may also be provided in the above-described RACH sequence group for the MCS 10. For example, when the channel state is falling below a predetermined threshold even when interference reduction processing by MIMO is performed, the interference suppression request signal control section 105 selects a signal sequence indicating that the interference suppression effect by MIMO is decreasing. By the MCS terminal 12 reporting the interference suppression effect by MIMO using a signal sequence of a random access signal, the CRS base station 21 can perform adaptive control of MIMO.

The above-described random access signal may be valid over a predetermined number of frames by the CRS base station 21. In such a case, the interference suppression request signal control section 105 may perform control so as to transmit the above random access signal with a transmission frequency of once in every predetermined number of frames.

When the synchronization establishment signal determining section 104 determines that the synchronization establishment signal has not been broadcast from the CRS base station 21, the MCS communication control section 106 performs control processing for performing communication with the MCS base station 11. To be more specific, the MCS communication control section 106 instructs the random access signal generation section 107 to generate a random access signal to start communication with the MCS base station 11.

The random access signal generation section 107 generates a random access signal based on an instruction from the interference suppression request signal control section 105 or MCS communication control section 106. The generated random access signal is outputted to the RF signal generation section 109 via the multiplexing section 108.

The multiplexing section 108 multiplexes the data signal inputted from the data signal generation section 110 to output to the RF signal generation section 109. The RF signal generation section 109 modulates the transmission symbol inputted from the multiplexing section 108 to generate an RF signal. Furthermore, the RF signal generation section 109 transmits the generated RF signal via an antenna (not shown). The RF signal generation section 109 and the antenna constitute a transmitting section.

The random access response signal detection section 111 detects a random access response signal from the control signal inputted from the BB signal processing section 101. The "random access response signal" here is a response signal corresponding to the random access signal from the MCS terminal 12. The random access response signal is transmitted via, for example, a downlink shared channel (PDSCH). The random access response signal detection section 111 outputs the detected random access response signal to the random access response signal determining section 112.

The random access response signal determining section 112 determines whether or not the random access response signal has been transmitted from the CRS base station 21 to the MCS terminal 12 based on the RACH sequence ID included in the random access response signal detected by the random access response signal detection section 111.

To be more specific, when the RACH sequence ID included in the random access response signal matches the RACH sequence ID of the random access signal (interference suppression request signal) transmitted to the CRS base station 21, the random access response signal determining section 112 determines that the random access signal has been transmitted from the CRS base station 21 to the MCS terminal 12.

When the random access response signal determining section 112 determines that the random access signal has been transmitted from the CRS base station 21 to the MCS terminal 12, the channel state estimation section 113 estimates the channel state from a reference signal from the CRS base station 21. The channel state estimation section 113 outputs channel state information indicating the estimated channel state to the channel state feedback signal control section 114. The channel state estimation section 113 constitutes an estimation section.

The channel state feedback signal control section 114 performs transmission control over a channel state feedback signal. To be more specific, the channel state feedback signal control section 114 instructs the channel state feedback signal generation section 115 to generate a channel state feedback signal including the channel state information inputted from the channel state estimation section 113.

Furthermore, the channel state feedback signal control section 114 instructs the channel state feedback signal generation section 115 to allocate the channel state feedback signal to an uplink resource specified by an uplink resource allocation field of the random access response signal (channel state request signal) from the CRS base station 21.

The channel state feedback signal generation section 115 generates a channel state feedback signal according to the instruction from the channel state feedback signal control section 114 or MCS communication control section 106. The generated channel state feedback signal is multiplexed with a data signal in the multiplexing section 108 and outputted to the RF signal generation section 109.

Figure 7:
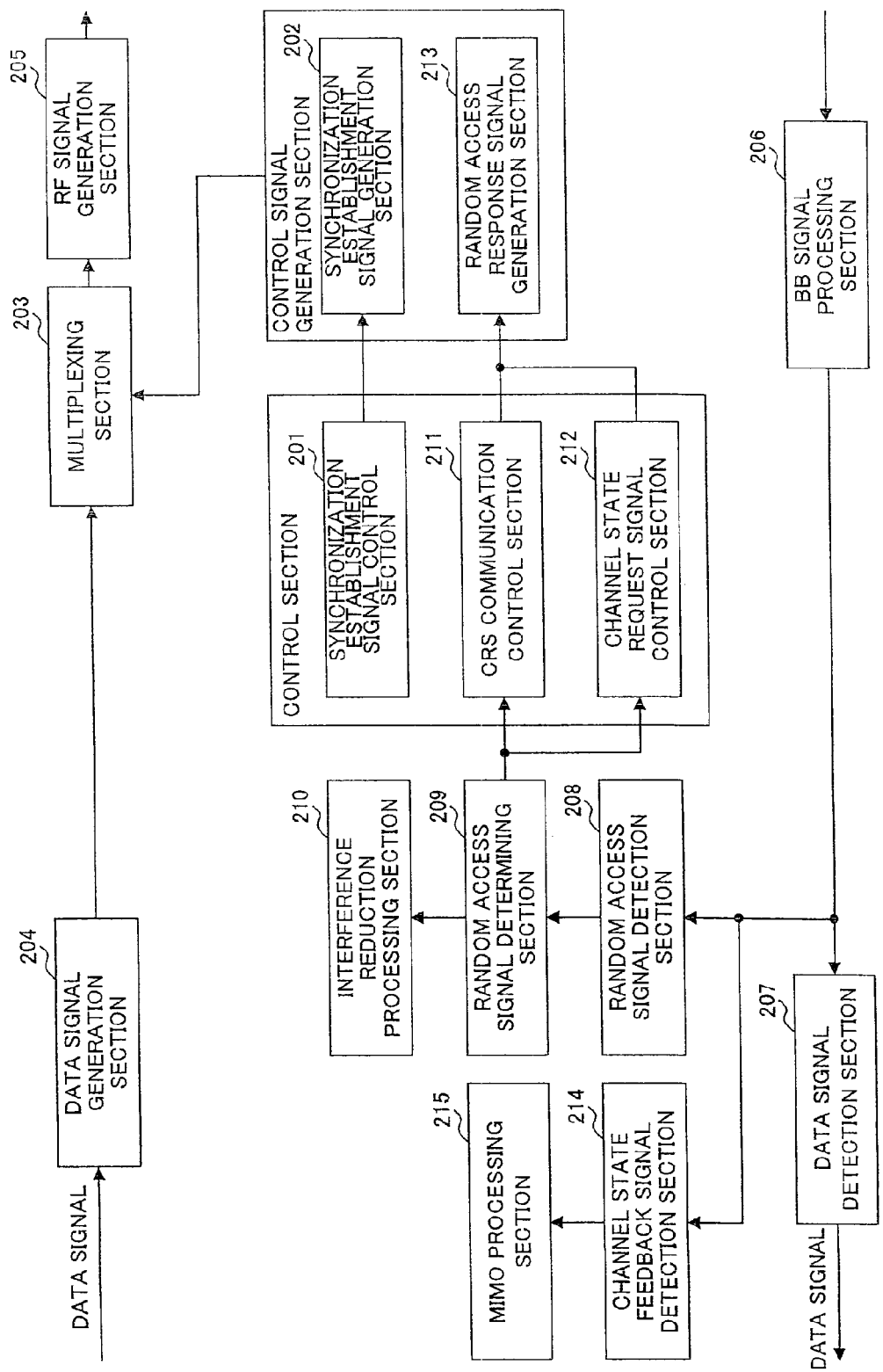
FIG. 7 is a function block diagram of a CRS base station according to the present embodiment.

FIG. 7 is a function block diagram of the CRS base station according to the embodiment of the present invention. As shown in FIG. 7, the CRS base station 21 includes a synchronization establishment signal control section 201, a synchronization establishment signal generation section 202, a multiplexing section 203, a data signal generation section 204, an RF signal generation section 205, a BB signal processing section 206, a data signal detection section 207, a random access signal detection section 208, a random access signal determining section 209, an interference reduction processing section 210, a CRS communication control section 211, a channel state request signal control section 212, a random access response signal generation section 213, a channel state feedback signal detection section 214 and a MIMO processing section 215.

The synchronization establishment signal control section 201 performs transmission control over a synchronization establishment signal. To be more specific, the synchronization establishment signal control section 201 controls the synchronization establishment signal generation section 202 so that a synchronization establishment signal is broadcast with a transmission frequency different from that of a synchronization establishment signal broadcast from the MCS base station 11. This is to allow the MCS terminal 12 to identify a synchronization establishment signal broadcast from the CRS base station 21 using the above-described first synchronization establishment signal determination method.

Furthermore, the synchronization establishment signal control section 201 may also control the synchronization establishment signal generation section 202 so that the synchronization establishment signal is broadcast with a signal sequence different from that of the synchronization establishment signal broadcast from the MCS base station 11. This is to allow the MCS terminal 12 to identify the synchronization establishment signal broadcast from the CRS base station 21 using the above-described second synchronization establishment signal determination method.

Furthermore, the synchronization establishment signal control section 201 may also specify, by using identification information of a secondary synchronization signal (hereinafter referred to as "S-SS ID"), a selecting method of a signal sequence of a random access signal in the MCS 10 and the MCS terminal 12 to which the random access signal (interference suppression request signal) should be transmitted. FIG. 8 is a diagram illustrating an example of contents specified using an S-SS ID. The contents shown in FIG. 8 are an illustration and the present invention is not limited to these contents.

As shown in FIG. 8, an S-SS ID "00001" instructs an arbitrary MCS terminal 12 to select a signal sequence corresponding to the amount of interference suppression. An S-SS ID "00002" instructs an MCS terminal 12 whose previous amount of interference suppression is a first threshold or above to randomly select a signal sequence. An S-SS ID "00003" instructs an MCS terminal 12 whose previous amount of interference suppression is a second threshold (e.g., second threshold>first threshold) or above to randomly select a signal sequence. An S-SS ID "00004" instructs an MCS terminal 12 whose previous amount of interference suppression is a third threshold (e.g., third threshold>second threshold) or above to randomly select a signal sequence.

The synchronization establishment signal control section 201 instructs the synchronization establishment signal generation section 202 to generate a synchronization establishment signal having an S-SS ID corresponding to desired contents with reference to FIG. 8. Specifying a selecting method of a signal sequence using an S-SS ID can prevent a plurality of MCS terminals 12 from transmitting a random access signal using the same signal sequence. Furthermore, some MCS terminals 12 having a large amount of interference suppression (that is, a large interfered amount) can transmit a random access signal (interference suppression request signal), thereby it becomes possible to perform interference reduction processing more efficiently. In particular, when MIMO, which will be described later, is applied, the interference reduction effect is limited to within a range in equation (2) below. Therefore, limiting the MCS terminals 12 that transmit a random access signal (interference suppression request signal) to only some terminals is effective.

(Number of antennas of CBS base station)<(total number of antennas of MCS terminal subject to interference suppression)+1    Equation (2)

The synchronization establishment signal generation section 202 generates a synchronization establishment signal according to an instruction of synchronization establishment signal control section 201. The generated synchronization establishment signal is outputted to the RF signal generation section 205 via the multiplexing section 203.

The multiplexing section 203 multiplexes the data signal inputted from the data signal generation section 204 to output to the RF signal generation section 205. The RF signal generation section 205 modulates the transmission symbol inputted from the multiplexing section 203 to generate an RF signal. Furthermore, the RF signal generation section 205 transmits the generated RF signal via an antenna (not shown). The RF signal generation section 205 and the antenna constitute a transmitting section.

The BB signal processing section 206 converts a radio frequency signal received via the antenna to a baseband signal, demodulates the baseband signal and separates it into a data signal and a control signal. The BB signal processing section 206 outputs the separated data signal to the data signal detection section 207 and outputs the separated control signal to the random access signal detection section 208. The BB signal processing section 206, antenna, and random access signal detection section 208 and channel state feedback signal detection section 214, which will be described later, constitute a receiving section.

The random access signal detection section 208 detects a random access signal from the control signal inputted from the BB signal processing section 206. Here, the random access signal is a signal transmitted from the MCS terminal 12 or CRS terminal 22 according to the synchronization establishment signal. The random access signal is transmitted through a random access channel (RACH). As the random access signal, for example, a random access preamble may also be used. The random access signal detection section 208 outputs the detected random access signal to random access signal determining section 209.

The random access signal determining section 209 determines whether or not the random access signal detected by the random access signal detection section 208 has been transmitted from the MCS terminal 12. To be more specific, the random access signal determining section 209 determines whether or not the random access signal has been transmitted from the MCS terminal 12 using the following first or second random access signal determination method.

According to the first random access signal determination method, the random access signal determining section 209 determines whether or not the random access signal has been transmitted from the MCS terminal 12 based on the radio resource from which the random access signal has been detected. In this case, when the random access signal is transmitted using the aforementioned first interference suppression request signal transmission method (see FIG. 5B), it is possible to identify the random access signal transmitted from the MCS terminal 12.

According to the second random access signal determination method, the random access signal determining section 209 determines whether or not the random access signal has been transmitted from the MCS terminal 12 based on the signal sequence of a random access signal. In this case, when the random access signal is transmitted using the aforementioned second interference suppression request signal transmission method (see FIG. 6), it is possible to identify the random access signal transmitted from the MCS terminal 12.

When it is determined, using the above-described first or second random access signal determination method, that the random access signal detected by the random access signal detection section 208 has been transmitted from the MCS terminal 12, the random access signal determining section 209 outputs the random access signal to the interference reduction processing section 210. On the other hand, when it is determined that the detected random access signal has not been transmitted from the MCS terminal 12, the random access signal determining section 209 outputs the random access signal to the CRS communication control section 211.

Furthermore, when it is determined that the detected random access signal has been transmitted from the MCS terminal 12, the random access signal determining section 209 may output the random access signal to the channel state request signal control section 212 to perform interference reduction processing using MIMO.

The interference reduction processing section 210 performs interference reduction processing (e.g., transmission power control and suspension of transmission or the like) on the MCS terminal 12 based on the random access signal inputted from the random access signal determining section 209. To be more specific, the interference reduction processing section 210 performs interference reduction processing using the following first or second transmission power control method.

According to the first transmission power control method, the interference reduction processing section 210 calculates the amount of interference suppression based on the receiving power of the random access signal from the MCS terminal 12 and reduces the transmission power according to the calculated amount of interference suppression. This method is applicable when a random access signal is transmitted from the MCS terminal 12 with certain transmission power as in the case of the above-described first interference suppression request signal transmission method.

To be more specific, the interference reduction processing section 210 estimates the amount of channel attenuation including an antenna gain from the receiving power of the interference suppression request signal using, for example, equation (3) below. Hereinafter, the estimated amount of channel attenuation will be referred to as "estimated amount of channel attenuation."

(Estimated amount of channel attenuation)=(propagation loss)−(antenna gain of CRS base stations)−(antenna gain of MCS terminal)=(transmission power of MCS terminal)−(receiving power of interference suppression request signal)    Equation (3)

Here, the interference power received by the MCS terminal 12 is calculated using equation (4) below.

(Interference power received by MCS terminal)= (transmission power of CRS base station)+(antenna gain of CRS terminal)−(propagation loss)+ (antenna gain of MCS terminal)  Equation (4)

The interference power received by the MCS terminal 12 needs to be equal to or below the allowable interference power of the MCS terminal 12. Therefore, the allowable transmission power in the CRS base station 21 is calculated using equation (5) below.

(Allowable transmission power of CRS base station)< (allowable interference power of MCS terminal)− (CRS base station antenna gain)+(amount of propagation loss)−(antenna gain of MCS terminal)=(allowable interference power of MCS terminal)−(amount of estimation propagation loss)  Equation (5)

The interference reduction processing section 210 controls the transmission power so as to satisfy the allowable transmission power of the CRS base station 21 calculated using equation (5). That is, the interference reduction processing section 210 assumes the difference between the calculated allowable transmission power and the current transmission power as the amount of interference suppression and reduces the transmission power by the amount of interference suppression.

The allowable interference power of the MCS terminal 12 may be power acquired by adding a predetermined margin to noise power. Furthermore, the allowable interference power of the MCS terminal 12 may be power acquired by adding a predetermined margin to a reference value to satisfy predetermined receiving quality.

The allowable transmission power of the CRS base station 21 is also preferably provided with a margin. This is because when FDD is used, even when the transmission and reception directions are the same, the transmitting antenna gain may be different from the receiving antenna gain or channel frequency characteristics may be different.

According to the second transmission power control method, the interference reduction processing section 210 reduces transmission power according to the amount of interference suppression corresponding to the signal sequence of a random access signal from the MCS terminal 12. This method is applicable to a case where a random access signal of a signal sequence corresponding to the amount of interference suppression is transmitted from the MCS terminal 12 as in the case of the above-described second interference suppression request signal transmission method.

When the random access signal determining section 209 determines that a random access signal has been transmitted from the CRS terminal 22, the CRS communication control section 211 performs control processing to perform communication with the CRS terminal 22. To be more specific, the CRS communication control section 211 instructs the random access response signal generation section 213 to generate a random access response signal to start communication with the CRS terminal 22.

When the random access signal determining section 209 determines that the random access signal has been transmitted from the MCS terminal 12, the channel state request signal control section 212 performs control processing on the MCS terminal 12 to request the channel state. To be more specific, the channel state request signal control section 212 controls the random access response signal generation section 213 so that a random access response signal as a channel state request signal is transmitted.

Furthermore, the channel state request signal control section 212 instructs the random access response signal generation section 213 to generate a random access response signal including identification information (RACH sequence ID) of the signal sequence of the random access signal transmitted from the MCS terminal 12. The MCS terminal 12 can detect, from the RACH sequence ID included in the random access response signal, that the signal is a response signal to the terminal corresponding to the random access signal (interference suppression request signal).

Furthermore, the channel state request signal control section 212 may also specify, by using an uplink resource allocation field included in the random access response signal, a radio resource for the MCS terminal 12 to report the channel state. As an Example of the uplink resource allocation field, uplink scheduling grant is used.

Furthermore, the channel state request signal control section 212 may also specify, by using the uplink resource allocation field of the random access response signal, information such as applied modulation scheme and applied coding rate.

Furthermore, the channel state request signal control section 212 may also provide a retransmission field in the random access response signal to specify whether or not the channel state is retransmission using the retransmission field. When the channel state is not reported from the MCS terminal 12 within a predetermined period, the channel state request signal control section 212 retransmits a random access response signal (channel state request signal).

The random access response signal generation section 213 generates a random access response signal according to an instruction from the CRS communication control section 211 or channel state request signal control section 212. The generated random access response signal is outputted to the RF signal generation section 205 via the multiplexing section 203.

The channel state feedback signal detection section 214 detects a channel state feedback signal from the control signal inputted from the BB signal processing section 206. The channel state feedback signal includes channel state information in the MCS terminal 12. The channel state feedback signal is transmitted with an uplink resource specified by the uplink resource allocation field of the aforementioned random access response signal. Furthermore, the channel state feedback signal is transmitted through, for example, an uplink shared channel (PUSCH). The channel state feedback signal detection section 214 outputs the detected channel state information to the MIMO processing section 215.

The MIMO processing section 215 performs control processing relating to MIMO application such as determination of transmission power when MIMO is applied. To be more specific, the MIMO processing section 215 determines transmission power when MIMO is applied based on the channel state information inputted from the channel state feedback signal detection section 214.

Furthermore, the MIMO processing section 215 may also determine the transmission power when MIMO is applied based on the required amount of interference suppression calculated by the MCS terminal 12. So that the MCS terminal 12 can calculate the amount of interference suppression, the MIMO processing section 215 may transmit a signal with a beam formed in a beam pattern generated using specified transmission power to calculate the amount of interference suppression. The method of calculating the amount of interference suppression in the MCS terminal 12 is as described above.

As described above, in the embodiment of the present invention, the MCS terminal 12 uses signals of the MCS 10 such as synchronization establishment signal, random access signal and random access response signal to define interference control signals, by which the MCS terminal 12 controls interference received from the CRS base station 21, such as interference broadcast signal, interference suppression request signal, channel state request signal. Therefore, it is possible to reduce interference that the MCS terminal 12 receives from the CRS base station 21 without significantly increasing the implementing load on the MCS terminal 12.

The CRS base station 21 according to the embodiment of the present invention may also be configured to use the same uplink band as that of the MCS base station 11. In order for the MCS terminal 12 to transmit a random access signal to the CRS base station 21, the MCS terminal 12 needs to acquire uplink band information (e.g., frequency, bandwidth or the like) of the CRS base station 21. Such uplink band information is normally included in broadcast information (e.g., SIB type2 in LTE) from the CRS base station 21. However, when the MCS terminal 12 attempts to acquire broadcast information from the CRS base station 21, the load on the MCS terminal 12 increases because the MCS 10 and the CRS 20 have different system configurations. Therefore, if the CRS base station 21 uses the same uplink band as that of the MCS base station 11, the MCS terminal 12 can acquire uplink band information based on the broadcast information from the MCS base station 11 without receiving broadcast information from the CRS base station 21.

Similarly, the CRS base station 21 according to the embodiment of the present invention may also be configured to use the same RACH configuration information (e.g., RACH resource allocation information, sequence generation parameter or the like) as that of the MCS base station 11. This is because the MCS terminal 12 can acquire the RACH configuration information based on the broadcast information from the MCS base station 11. Alternatively, the CRS base station 21 may also set the RACH configuration information to fixed values and the RACH configuration information may be set in the MCS terminal 12 beforehand.

Furthermore, in the embodiment of the present invention, regarding parameters using values more specific to each base station of the RACH configuration information, using the same value as that of the MCS base station 11 may cause the load of the MCS terminal 12 to increase further. For this reason, a signal format may be separately defined between the MCS terminal 11 and the CRS base station 12 so as to be broadcast from the CRS base station 21 to the MCS terminal 12.

Furthermore, the present invention is not limited to the above-described embodiments, but may be implemented modified in various ways. For example, regarding the configurations of the MCS terminal 12 and CRS base station 21 shown in FIG. 3 and FIG. 7, the entire configuration of the interference reduction processing according to the present invention is shown. Therefore, part of the configuration may be omitted or some configurations may be combined. The present invention may be implemented by modifying the processing section and processing procedure as appropriate without departing from the scope of the present invention. The present invention may also be implemented by modifying other aspects thereof without departing from the scope of the present invention.

What is claimed is:

1. A user terminal of a first radio communication system that shares at least part of a frequency band with a second radio communication system, comprising:
    a receiver configured to receive an interference broadcast signal defined in a format of a synchronization establishment signal in the first radio communication system;
    processing circuitry configured to determine whether or not the interference broadcast signal received by the receiver has been broadcast from a radio base station of the second radio communication system; and
    a transmitter configured to transmit an interference suppression request signal defined in a format of a random access signal in the first radio communication system to the radio base station of the second radio communication system to request the radio base station to perform interference reduction processing, when the processing circuitry determines that the interference broadcast signal has been broadcast from the radio base station of the second radio communication system.

2. The user terminal according to claim 1, wherein the processing circuitry is configured to determine, based on a peak detection frequency of the interference broadcast signal received by the receiver, whether or not the interference broadcast signal has been broadcast from the radio base station of the second radio communication system.

3. The user terminal according to claim 1, wherein the processing circuitry is configured to determine, based on a signal sequence of the interference broadcast signal received by the receiver, whether or not the interference broadcast signal has been broadcast from the radio base station of the second radio communication system.

4. The user terminal according to claim 1, wherein the transmitter is configured to transmit the interference suppression request signal with a radio resource different from that of the random access signal transmitted from a user terminal of the second radio communication system.

5. The user terminal according to claim 1, wherein the transmitter is configured to transmit the interference suppression request signal with a signal sequence different from that of the random access signal transmitted from a user terminal of the second radio communication system.

6. The user terminal according to claim 5, wherein the transmitter is configured to transmit the interference suppression request signal with a signal sequence randomly selected from a group of signal sequences allocated to the first radio communication system.

7. The user terminal according to claim 5, wherein the transmitter is configured to transmit the interference suppression request signal with a signal sequence corresponding to a desired amount of interference suppression selected from the group of the signal sequences allocated to the first radio communication system.

8. The user terminal according to claim 1, the processing circuitry being further configured to estimate a channel state, wherein:
    the receiver is configured to receive a channel state request signal corresponding to the interference suppression request signal,
    the processing circuitry is configured to determine, based on identification information of a signal sequence of the interference suppression request signal included in the channel state request signal received by the receiver, whether or not the channel state request signal has been transmitted from the radio base station of the second radio communication system to the user terminal,
    when the processing circuitry determines that the channel state request signal has been transmitted from the radio base station of the second radio communication system to the terminal, the processing circuitry is configured to estimate the channel state based on a reference signal from the radio base station, and
    the transmitter is configured to transmit the estimated channel state to the radio base station.

* * * * *